US008136653B2

(12) United States Patent
Okimoto

(10) Patent No.: US 8,136,653 B2
(45) Date of Patent: Mar. 20, 2012

(54) LONG-MATERIAL CONVEYING AND POSITIONING APPARATUS

(75) Inventor: Taichi Okimoto, Amagasaki (JP)

(73) Assignee: Daito Seiki Co., Ltd., Hyogo (JP)

( * ) Notice: Subject to any disclaimer, the term of this patent is extended or adjusted under 35 U.S.C. 154(b) by 130 days.

(21) Appl. No.: 12/795,845

(22) Filed: Jun. 8, 2010

(65) Prior Publication Data

US 2011/0011701 A1    Jan. 20, 2011

(30) Foreign Application Priority Data

Jul. 17, 2009   (JP) ................................. 2009-169305

(51) Int. Cl.
*B23Q 7/05*   (2006.01)
(52) U.S. Cl. ..... 198/624; 198/722; 198/747; 198/345.1; 414/18; 414/20; 414/745.1; 414/746.7
(58) Field of Classification Search .................. 198/624, 198/722, 736, 747; 414/18–20, 745.1, 746.7; 226/181
See application file for complete search history.

(56) References Cited

U.S. PATENT DOCUMENTS

| 3,493,125 | A | * | 2/1970 | White et al. | 414/15 |
| 3,881,589 | A | * | 5/1975 | Peddinghaus | 198/624 |
| 4,732,066 | A | * | 3/1988 | Del Fabro et al. | 83/277 |
| 4,765,273 | A | * | 8/1988 | Anderle | 118/729 |
| 4,972,890 | A | * | 11/1990 | Isley | 144/246.1 |
| 5,980,191 | A | * | 11/1999 | Trible | 414/746.7 |
| 6,158,572 | A | * | 12/2000 | Butler et al. | 198/624 |

FOREIGN PATENT DOCUMENTS

| EP | 1 645 344 A1 | 4/2006 |
| JP | 60-056850 | 4/1985 |
| JP | 8-224635 | 9/1996 |
| JP | 2000-042805 | 2/2000 |
| JP | 2000-233338 | 8/2000 |

OTHER PUBLICATIONS

European Search Report issued Apr. 29, 2011 in corresponding European Application No. 10 00 6918.

* cited by examiner

*Primary Examiner* — Mark A Deuble
(74) *Attorney, Agent, or Firm* — Wenderoth, Lind & Ponack, L.L.P.

(57) ABSTRACT

Under a state in which a long material (structural steel (A)) is sandwiched by pinch rollers (drive roller (21) and idle rollers (22)) of a pinch roller apparatus (20), the drive roller (21) is driven to rotate, and the structural steel (A) is conveyed forward. When a rear end portion of the structural steel (A) reaches a vicinity of the pinch roller apparatus (20), the rear end portion of the structural steel (A) is held by a holding portion (32) provided at a front end portion of a feed bar (36) of a feed bar device (30), and the feed bar (36) is caused to slide toward a working machine. Consequently, the structural steel (A) is conveyed forward through the pinch roller apparatus (20) and is positioned.

10 Claims, 12 Drawing Sheets

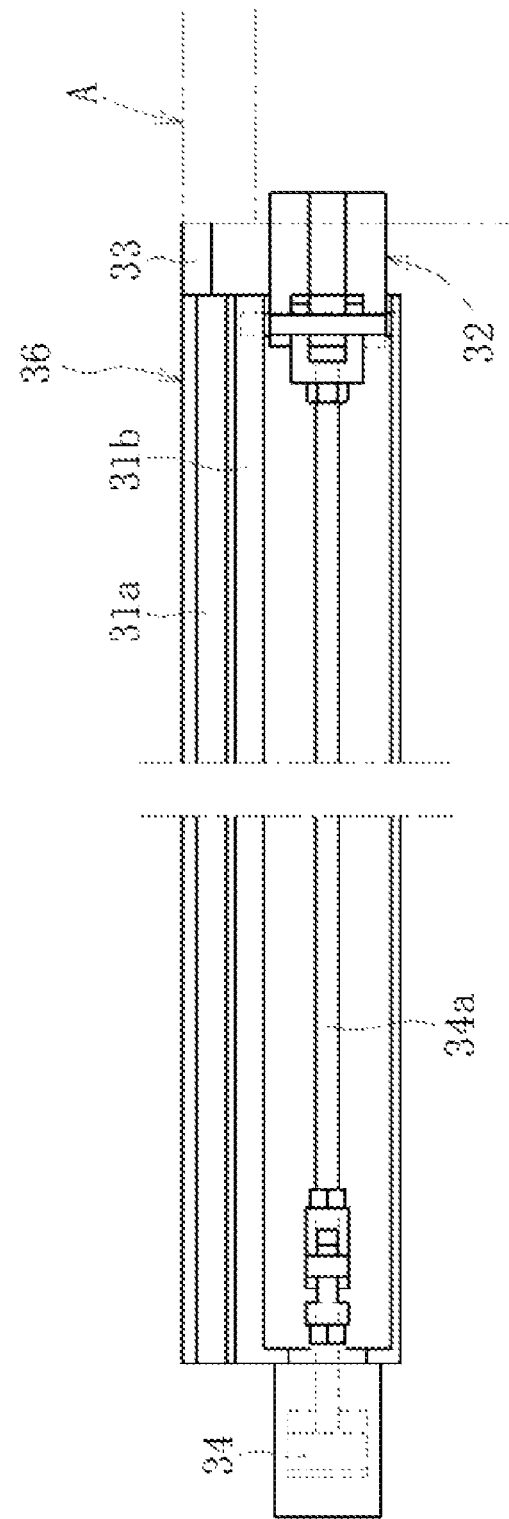

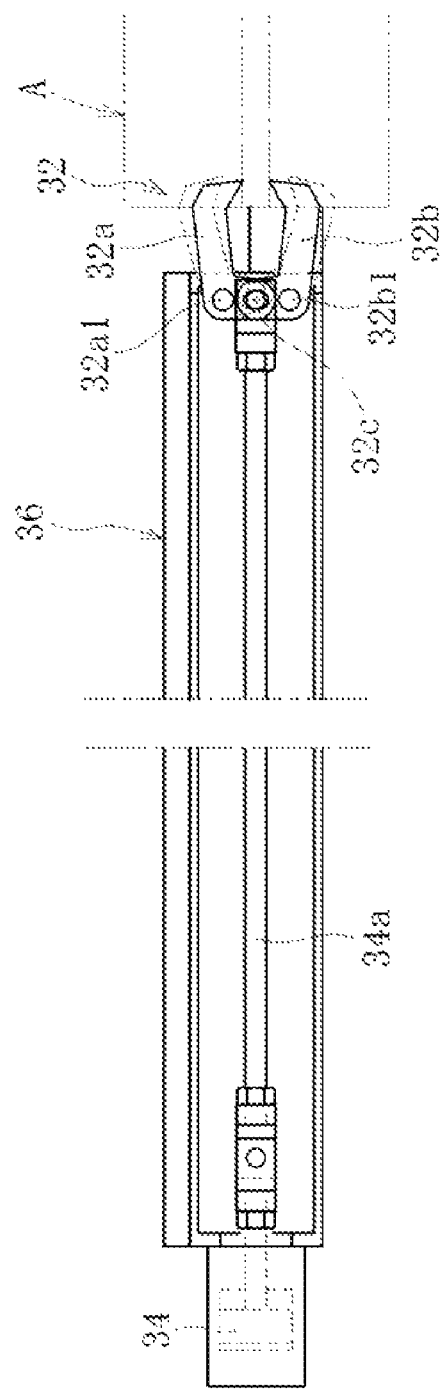

LONG-MATERIAL CONVEYING AND POSITIONING APPARATUS

TECHNICAL FIELD

The present invention relates to a long-material conveying and positioning apparatus, which conveys a long material such as a structural steel toward a working machine such as a cutter, and which positions the long material.

BACKGROUND ART

As the long-material conveying and positioning apparatus (hereinafter, simply referred to as "positioning apparatus"), there is known, for example, a carriage type positioning apparatus or a pinch-roller type positioning apparatus. The carriage type positioning apparatus holds a rear end portion of a long material with a carriage, and causes the carriage to slide toward a working machine under this state, to thereby convey and position the long material (for example, see Patent Literature 1). Meanwhile, the pinch-roller type positioning apparatus sandwiches a long material with pinch rollers, and drives the pinch rollers to rotate under this state, to thereby convey and position the long material (for example, see Patent Literature 2).

CITATION LIST

Patent Literature

[PTL 1] JP 2000-42805 A
[PTL 2] JP 60-56850 A

SUMMARY OF INVENTION

Technical Problem

The carriage type positioning apparatus described in Patent Literature 1 includes a guide rail 23 for causing a carriage 27 to slide to one side of a conveying table 19. The guide rail 23 needs to be provided over an entire length of the conveying table 19, and hence the long material (structural steel W) cannot be laterally carried in onto the conveying table 19 from a guide rail 23 side. Thus, the long material can be carried in onto the conveying table 19 only from a side opposite to the guide rail 23 side.

Meanwhile, in the pinch-roller type positioning apparatus described in Patent Literature 2, it is unnecessary to provide the guide rail unlike the case of the carriage type positioning apparatus, and hence the long material can be laterally carried in from any side of the conveying table without any trouble. However, after the rear end portion of the long material passes the pinch rollers, the long material cannot be sandwiched by the pinch rollers any longer, and hence it is impossible to convey the long material. As a result, an unworkable portion of a material is unavoidable.

Therefore, it is an object of the present invention to provide a positioning apparatus, which is capable of laterally carrying the long material in onto the conveying table from any side in a lateral direction of the conveying table and eliminating an unworkable portion of a material.

Solution to Problem

In order to achieve the above-mentioned object, according to the present invention, there is provided a long-material conveying and positioning apparatus, which conveys a long material along a longitudinal direction thereof to a working machine. The long-material conveying and positioning apparatus includes: a pinch roller apparatus which includes pinch rollers formed of a plurality of rollers including at least one drive roller, and conveys the long material toward the working machine by driving the drive roller to rotate under a state in which the pinch rollers sandwich the long material; and a feed bar device including a feed bar extending in a conveying direction of the long material, a support portion for supporting the feed bar to allow the feed bar to slide in the conveying direction, and a holding portion provided at an end portion of the feed bar on a side of the working machine, for holding the long material, the feed bar device allowing the feed bar to slide until the holding portion passes the pinch roller apparatus to reach a desired position in an inside of the working machine.

According to the positioning apparatus, the long material, which cannot be conveyed by the pinch roller apparatus any longer, can be conveyed by the feed bar device with a short stroke. In other words, under a state in which the pinch rollers of the pinch roller apparatus sandwich the long material, the drive roller is driven to rotate, and the long material is conveyed forward. When the rear end portion (end portion on a side opposite to the working machine) of the long material reaches a vicinity of the pinch roller apparatus, the rear end portion of the long material is held by the holding portion provided at a front end portion (end portion on the side of the working machine) of the feed bar of the feed bar device, and the long material is caused to slide toward the working machine together with the feed bar. Consequently, it is possible to convey the long material through the pinch roller apparatus toward the working machine, and to position the long material. Thus, main conveyance can be performed by the pinch roller apparatus, and hence it is unnecessary to provide the guide rail over the entire length of the conveying table unlike the case of the carriage type positioning apparatus described in Patent Literature 1. Consequently, it is possible to laterally carry the long material in from any side of the conveying table. Further, owing to the feed bar device, it is possible to convey the long material through the pinch roller apparatus to a working position, and to position the long material. Thus, it is possible to eliminate an unworkable residual material.

Further, when the feed bar serving as a moving side includes a guide rail extending in the conveying direction and the support portion serving as a stationary side includes a guide portion which fits onto the guide rail, it is unnecessary to provide the guide rail on the stationary side. Consequently, it is possible to further increase a space through which the long material is carried in onto the conveying table.

In the positioning apparatus as described above, in general, a length measuring device for measuring a feeding amount of the long material is provided, and positioning of the long material is performed in the working machine based on a result measured by the length measuring device. Specifically, the length measuring device (for example, length measuring disk) is brought into contact with the long material, and a pulse generator counts a rotating amount of the length measuring disk generated along with conveyance of the long material. Consequently, the feeding amount of the long material is measured. However, in a case where the long material is fed forward beyond a portion of the conveying table, which corresponds to the length measuring disk, the length measuring disk cannot be brought into contact with the long material, and hence it is impossible to measure the feeding amount of the long material, and to position the material. In this context, if the length measuring disk is brought into contact with the feed bar holding the long material to measure the feeding amount of the long material, even in a case where the long material is conveyed after the rear end portion of the long material passes a position corresponding to the length measuring disk, it is possible to indirectly measure the feeding amount of the long material. At this time, if one side surface of the long material and one side surface of the feed bar are aligned and arranged in the conveying direction on the same plane, the length measuring device can be continuously held in contact with those side surfaces, and hence it is possible to precisely position the long material over the entire length of the long material without generating an error in length measuring.

When the long material is conveyed through the pinch rollers, the long material cannot be sandwiched and conveyed by the pinch roller apparatus any longer. If the pinch rollers are allowed to drive the feed bar while sandwiching the feed bar, it is possible to convey the long material through the pinch rollers toward the working machine in a stable state.

Advantageous Effects of Invention

As described above, according to the present invention, it is possible to obtain a long-material conveying and positioning apparatus, which is capable of laterally carrying the long material in onto the conveying table from any side in a lateral direction of the conveying table and eliminating an unworkable portion of a material.

BRIEF DESCRIPTION OF DRAWINGS

FIG. 7A is a plane view of a feed bar.

FIG. 7B is a side view of the feed bar.

DESCRIPTION OF EMBODIMENTS

Hereinafter, an embodiment of the present invention is described with reference to the drawings.

Figure 1:
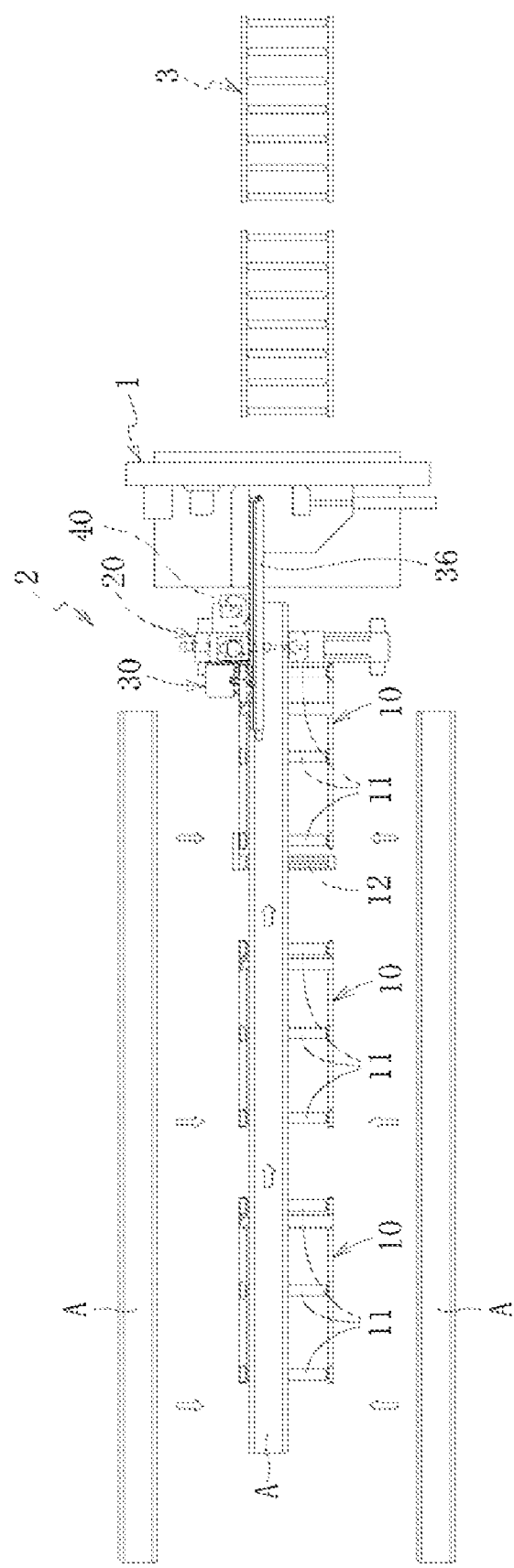
FIG. 1 is a plane view of a working apparatus including a positioning apparatus according to the present invention.
Figure 2:
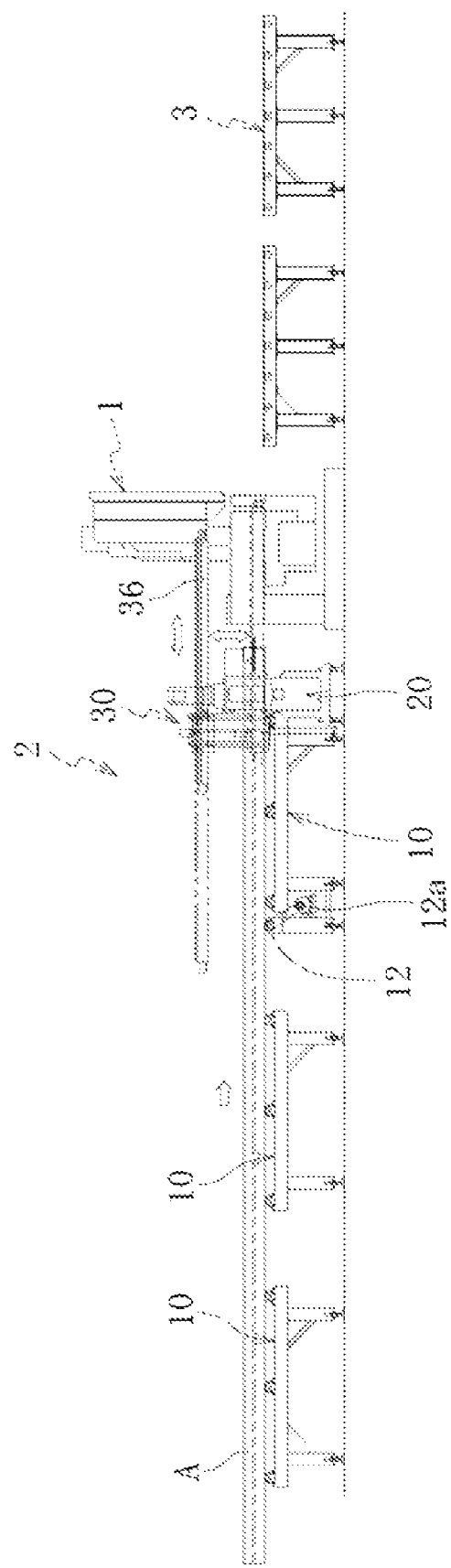
FIG. 2 is a side view of the working apparatus of FIG. 1.

A working apparatus (cutting apparatus) illustrated in FIGS. 1 and 2 cuts a structural steel A (H-beam in the illustrated example) as a long material to a predetermined length. The working apparatus includes a cutter 1 serving as a working machine, a positioning apparatus 2 according to the embodiment of the present invention which is provided on a carry-in side (left side in FIG. 1) of the cutter 1, and a carry-out roller table 3 provided on a carry-out side (right side in FIG. 1) of the cutter 1. Note that, in the following, for the convenience of description, the carry-out side (carry-out roller table 3 side) and the carry-in side (positioning apparatus 2 side) with respect to the cutter 1 in a conveying direction (right-left direction in FIG. 1) of the structural steel A are referred to as a front side and a rear side, respectively. Further, a horizontal direction (up-down direction in FIG. 1) orthogonal to the conveying direction is referred to as a width direction.

The positioning apparatus 2 includes a conveying table on which the structural steel A is placed, a pinch roller apparatus 20, and a feed bar device 30. The conveying table in the illustrated example includes a plurality of (three in the illustrated example) roller tables 10 aligned in the conveying direction. In each of the roller tables 10, a plurality of free rollers 11 each having a rotation axis in the width direction are aligned and arranged in the conveying direction. At a rear end portion of the forefront roller table 10, a carry-in roller 12 is provided. The carry-in roller 12 is a drive roller which is driven to rotate by rotation driving means 12a illustrated in FIG. 2. The carry-in roller 12 can be slightly lifted up and down by lifting means (not shown). When the carry-in roller 12 is slightly lifted up by the lifting means, the carry-in roller 12 is pressed from below the structural steel A against the structural steel A placed on the roller tables 10. When the carry-in roller 12 is driven to rotate by the rotation driving means 12a under this state, the structural steel A is conveyed forward.

Figure 3:
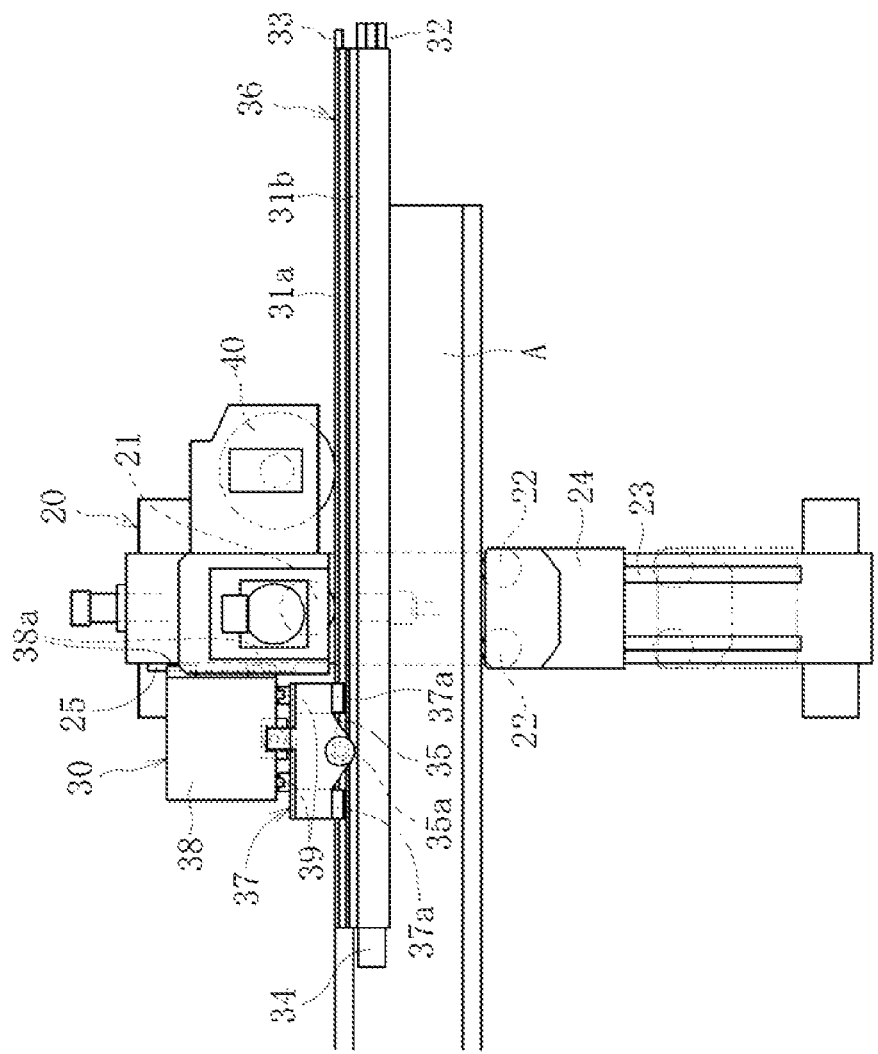
FIG. 3 is a plane view of a pinch roller apparatus and a feed bar device.

The pinch roller apparatus 20 includes pinch rollers capable of sandwiching the structural steel A from both sides in the width direction thereof. As illustrated in FIG. 3, the pinch rollers according to this embodiment include a drive roller 21, and two idle rollers 22 provided to be opposed to the drive roller 21 in the width direction. Each of the drive roller 21 and the idle rollers 22 has a rotation axis in a vertical direction. The drive roller 21 is driven to rotate by a driving device (not shown). The idle rollers 22 are rotatably mounted onto a slide base 24 which is provided to be slidable along rails 23 extending in the width direction (up-down direction in FIG. 3). When the slide base 24 is caused to slide in the width direction, the pinch rollers (drive roller 21 and idle rollers 22) are allowed to sandwich the structural steel A therebetween (see FIG. 3), or are allowed to sandwich a feed bar 36 therebetween (see FIG. 4).

The pinch roller apparatus 20 includes a length measuring disk 40 serving as a length measuring device. In the illustrated example, the length measuring disk 40 is provided on the front side with respect to the drive roller 21. The length measuring disk 40 rotates along with conveyance of the structural steel A, to thereby measure a feeding amount of the structural steel A. Specifically, the length measuring disk 40 rotatable in the horizontal direction is brought into contact with a side surface of the structural steel A, and the structural steel A is conveyed under this state. Consequently, the length measuring disk 40 is caused to rotate. Through counting a rotating amount of the length measuring disk 40 by a pulse generator (not shown), the feeding amount of the structural steel A is measured. A result measured by the length measuring disk 40 is sent as feedback to a control portion (not shown), and thus the structural steel A is positioned.

Figure 5:
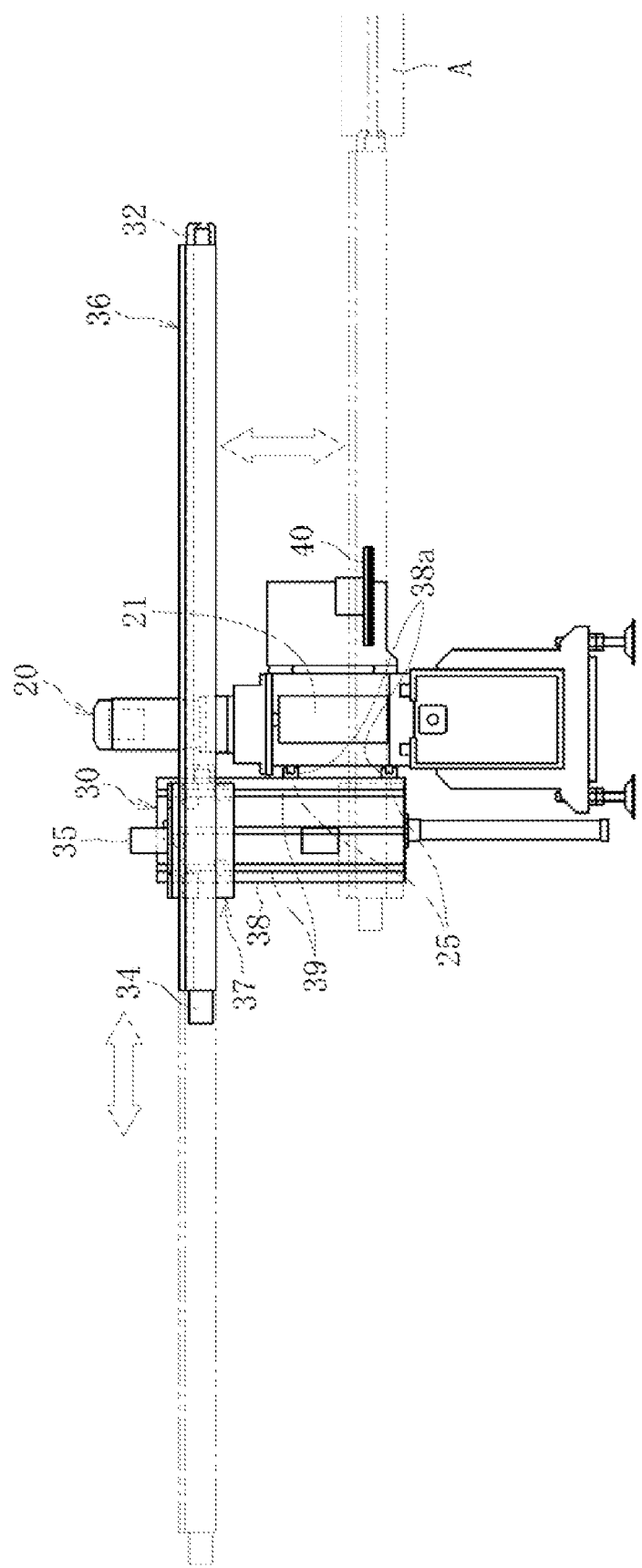
FIG. 5 is a side view of the pinch roller apparatus and the feed bar device.
Figure 6:
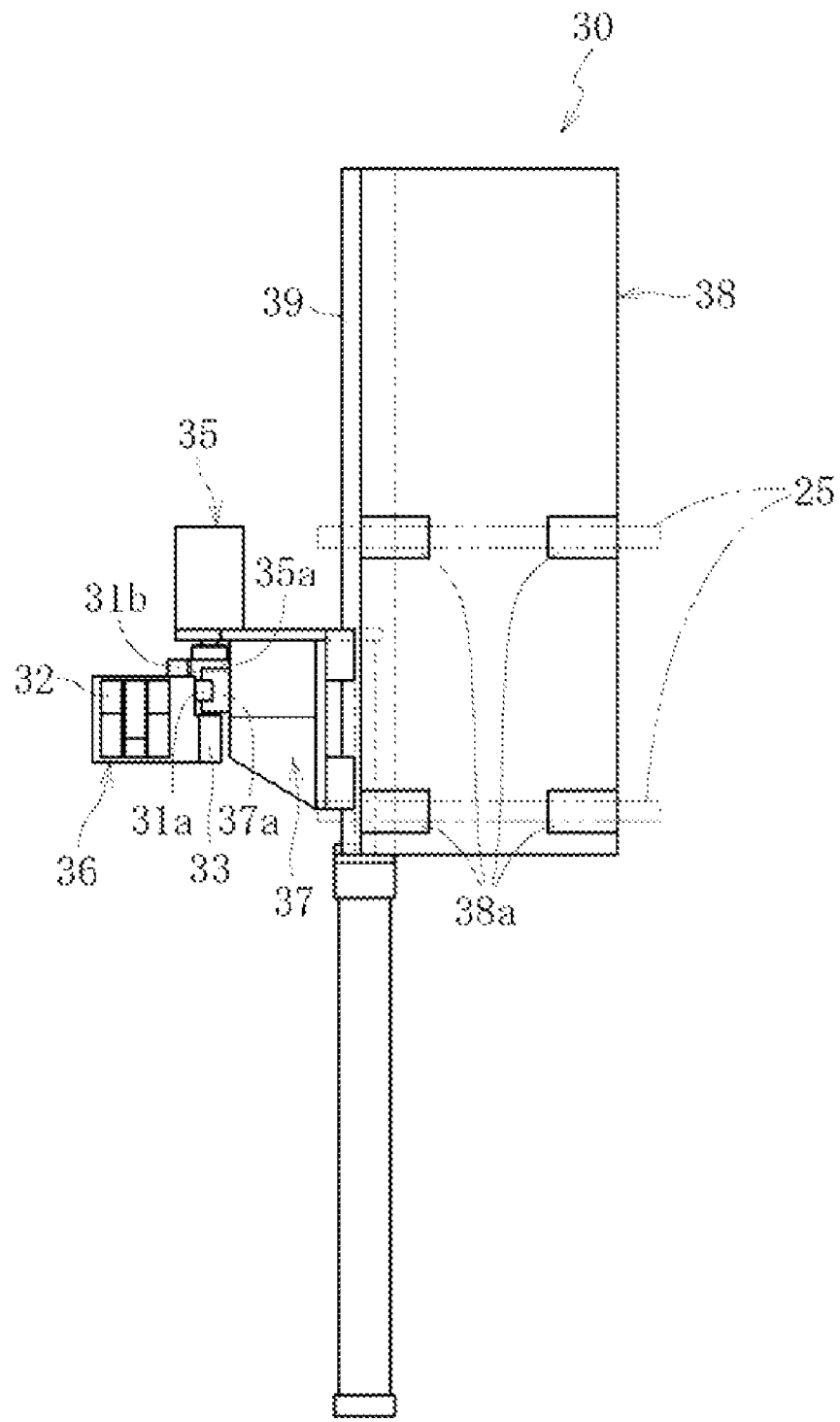
FIG. 6 is a front view of the feed bar device.

As illustrated in FIG. 5, the feed bar device 30 mainly includes the feed bar 36 extending in the conveying direction, a support portion 37 for supporting the feed bar 36 to allow the feed bar 36 to slide in the conveying direction, and a base 38 onto which the support portion 37 is fixed to be allowed to move up and down. The base 38 is fixed on a rear side surface of the pinch roller apparatus 20. Specifically, two guide rails 25 are provided in the width direction on the rear side surface of the pinch roller apparatus 20, and guide portions 38a are provided on a front side surface of the base 38. The guide rails 25 and the guide portions 38a are fitted to each other, and thus the feed bar device 30 is fixed onto the pinch roller apparatus 20 to be slidable in the width direction. Further, two rails 39 are provided in the vertical direction on a side surface of the base 38, and thus the support portion 37 is fixed onto the base 38 to be slidable in the vertical direction along the rails 39 (see FIG. 6).

As illustrated in FIG. 3, a guide rail 31a is provided on a side surface of the feed bar 36 over an entire length thereof. The support portion 37 includes guide portions 37a for guiding the guide rail 31a of the feed bar 36. When the guide rail 31a and the guide portions 37a are fitted to each other, the feed bar 36 is supported by the support portion 37 to be slidable in the conveying direction (see FIG. 6). Further, a rack gear 31b is formed on the side surface of the feed bar 36 over the entire length thereof. The support portion 37 is provided with a pinion gear 35a, and a pinion motor 35 for driving the pinion gear 35a to rotate. When the rack gear 31b and the pinion gear 35a are meshed with each other and the pinion gear 35a is driven to rotate under this state, the feed bar 36 slides in the conveying direction.

At a front end portion (right end portion in FIGS. 7A and 7B) of the feed bar 36, a holding portion for holding the structural steel A is provided. In the illustrated example, as the holding portion, there is provided a clamp portion 32 including clamp claws 32a and 32b for clamping the structural steel A from above and below the structural steel A. The clamp claws 32a and 32b are pivotably fixed to the feed bar 36 at fulcrums 32a1 and 32b1, respectively, and are pivotably fixed to each other at a pin 32c (see FIG. 7B). The pin 32c is connected through an intermediate rod 34a to a drive cylinder 34 provided at a rear end portion of the feed bar 36. When the drive cylinder 34 is caused to retreat, the pin 32c is pulled rearward through the intermediate rod 34a. Consequently, the clamp portion 32 is closed, to thereby clamp the structural steel A (see solid lines of FIG. 7B). A positioning portion 33 protruding forward is provided at the front end portion of the feed bar 36. When the positioning portion 33 is brought into contact with a rear end portion of the structural steel A, the feed bar 36 is positioned with respect to the structural steel A, and a depth by which the clamp portion 32 clamps the structural steel A is determined.

Next, a method of conveying the structural steel A by the positioning apparatus 2 is described.

First, as illustrated in FIG. 1, the structural steel A is laterally carried in onto the roller tables 10 of the positioning apparatus 2 from one side in the width direction. At this time, a rail, etc. is not provided to each side of the roller tables 10, and hence the structural steel A can be carried in from any side in the width direction of the roller tables 10 without any trouble (see arrows of FIG. 1). At this time, the feed bar 36 is arranged at the uppermost position and at a vicinity of the forefront position (see the position indicated by solid lines of FIGS. 1 and 2). Thus, it is possible to avoid the feed bar 36 and the structural steel A from interfering with each other at the time of carrying-in the structural steel A.

When the structural steel A is carried in on the roller tables 10, the carry-in roller 12 is slightly lifted up by the lifting means and is pressed against the structural steel A. Under this state, the carry-in roller 12 is driven to rotate by the rotation driving means 12a, and thus the structural steel A is conveyed forward. At this time, the slide base 24 of the pinch roller apparatus 20 is retreated to a position furthest away from the drive roller 21 (see imaginary lines of FIG. 3), and thus the structural steel A and the slide base 24 are avoidable from interfering with each other.

When a front end portion of the structural steel A reaches the length measuring disk 40 of the pinch roller apparatus 20, the carry-in roller 12 is lowered, and the slide base 24 of the pinch roller apparatus 20 is caused to slide in the width direction. Consequently, the structural steel A is sandwiched between the drive roller 21 and the idle rollers 22 (see FIG. 3). Under this state, the drive roller 21 is driven to rotate, and thus the structural steel A is conveyed forward. At this time, the feed bar 36 is retained at the uppermost position, and hence the structural steel A is conveyed without interfering with the feed bar 36 (see FIG. 2).

Figure 8:
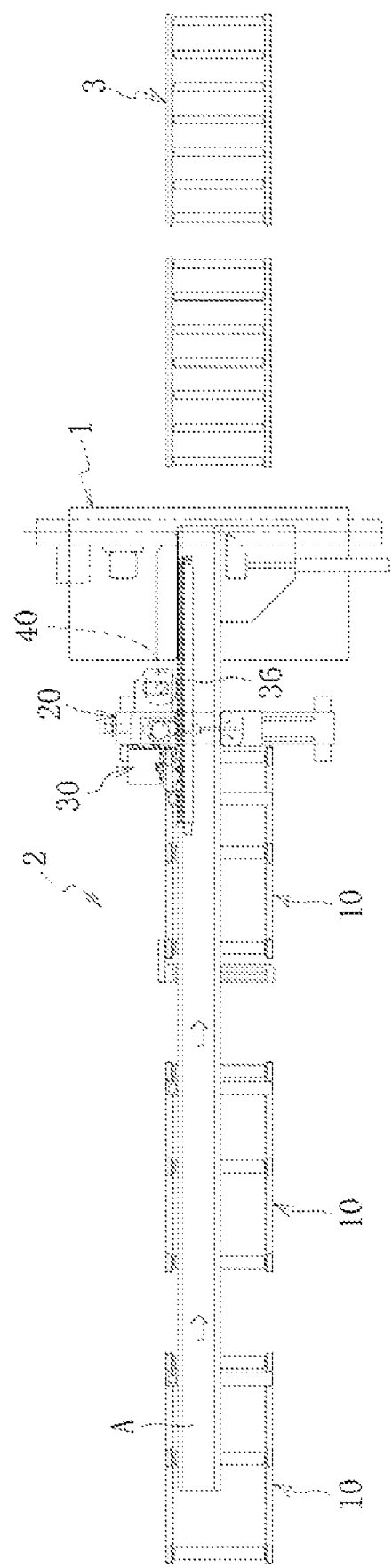
FIG. 8 is a plane view illustrating a state in which the positioning apparatus conveys a long material.

When the structural steel A reaches a predetermined position (see FIG. 8), the drive roller 21 is stopped, and the structural steel A is positioned. Then, the cutter 1 cuts the structural steel A at a predetermined point thereof. After that, the drive roller 21 is driven to rotate again, and the structural steel A is conveyed forward by a predetermined amount. Then, the structural steel A is positioned and cut at next point thereof. At this time, the structural steel A is conveyed while the length measuring disk 40 measures the feeding amount of the structural steel A, and the structural steel A is positioned based on the measurement result of the feeding amount. Thus, it is possible to perform working with good accuracy.

Figure 9:
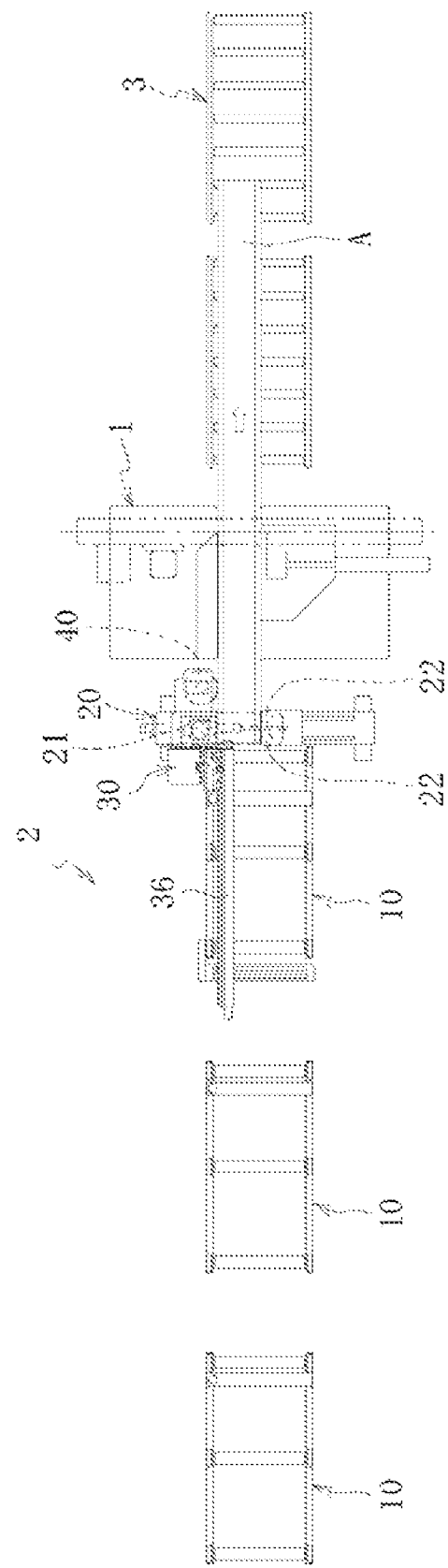
FIG. 9 is a plane view illustrating a state in which the positioning apparatus conveys the long material.

When the rear end portion of the structural steel A reaches the pinch roller apparatus 20 after the conveyance and working of the structural steel A are repeated in this way, conveyance by the pinch roller apparatus 20 is switched to conveyance by the feed bar device 30. Specifically, as illustrated in FIG. 9, when the rear end portion of the structural steel A reaches a position corresponding to one of the idle rollers 22 on the rear side of the pinch roller apparatus 20, the drive roller 21 is stopped, and the structural steel A is temporarily stopped. Under this state, after the feed bar 36 is caused to slide rearward until the front end portion of the feed bar 36 is situated on the rear side with respect to the structural steel A, the feed bar 36 is lowered to a height at which the structural steel A can be clamped. Further, the feed bar 36 is caused to slide forward, and the positioning portion 33 of the feed bar 36 and the rear end portion of the structural steel A are brought into contact with each other. Consequently, the feed bar 36 is positioned with respect to the structural steel A. Under this state, the clamp portion 32 is closed, to thereby clamp the structural steel A from above and below the structural steel A (see FIGS. 7A and 7B).

Figure 10:
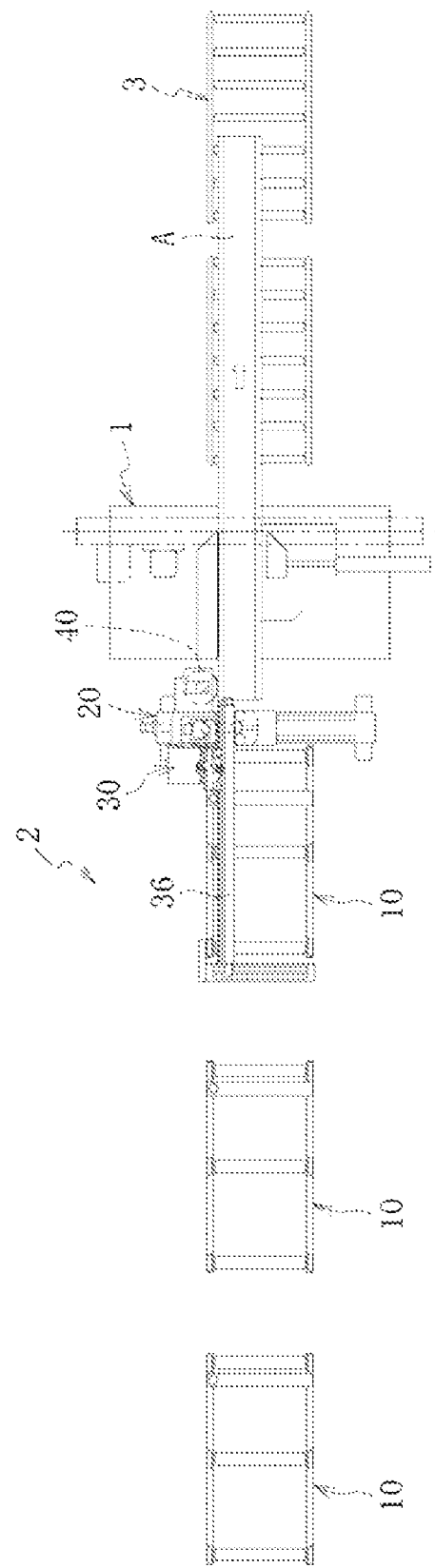
FIG. 10 is a plane view illustrating a state in which the positioning apparatus conveys the long material.

Further, the slide base 24 of the pinch roller apparatus 20 is caused to slide in the width direction, and sandwiching of the structural steel A is released. Then, the feed bar 36 and the structural steel A are caused to slide forward. Specifically, after the clamp portion 32 clamps the structural steel A, the feed bar 36 is caused to slide forward by a rack and pinion mechanism, and thus the structural steel A is conveyed forward. Further, when the portion of the structural steel A clamped by the clamp portion 32 of the feed bar 36 passes the pinch roller apparatus 20, the feed bar 36 and the structural steel A are stopped temporarily. Then, the slide base 24 is caused to slide in the width direction, and the feed bar 36 is sandwiched by the drive roller 21 and the idle rollers 22 (see FIG. 10). In this case, the feed bar device 30 is provided to be slidable in the width direction with respect to the pinch roller apparatus 20. Therefore, even if a position, at which the feed bar 36 is to be sandwiched by the drive roller 21 and the idle rollers 22, and a position of the feed bar 36 before performing sandwiching are slightly out of alignment in the width direction, the feed bar 36 is caused to slide in the width direction, and hence the feed bar 36 can be sandwiched reliably by the drive roller 21 and the idle rollers 22. Under this state, the drive roller 21 is driven, and thus the feed bar 36 and the structural steel A are conveyed forward. In this way, through conveying the feed bar 36 and the structural steel A by the drive roller 21 and the idle rollers 22 of the pinch roller apparatus 20, it is possible to convey the feed bar 36 and the structural steel A in a stable state. Further, in this embodiment, only when sandwiching of the structural steel A by the drive roller 21 and the idle rollers 22 is switched to sandwiching of the feed bar 36 by the drive roller 21 and the idle rollers 22, conveyance of the structural steel A is performed by the rack and pinion mechanism. In other words, conveyance by the rack and pinion mechanism with a relatively low conveying speed is limited to the minimum necessary level, whereas other conveyance is performed by the pinch rollers with a relatively high conveying speed. As a result, it is possible to increase conveying efficiency. Of course, it is not necessarily switching the way of sliding the feed bar 36 from the rack and pinion mechanism to the pinch roller apparatus 20. The feed bar 36 can be slide to the end by the rack and pinion mechanism.

Figure 4:
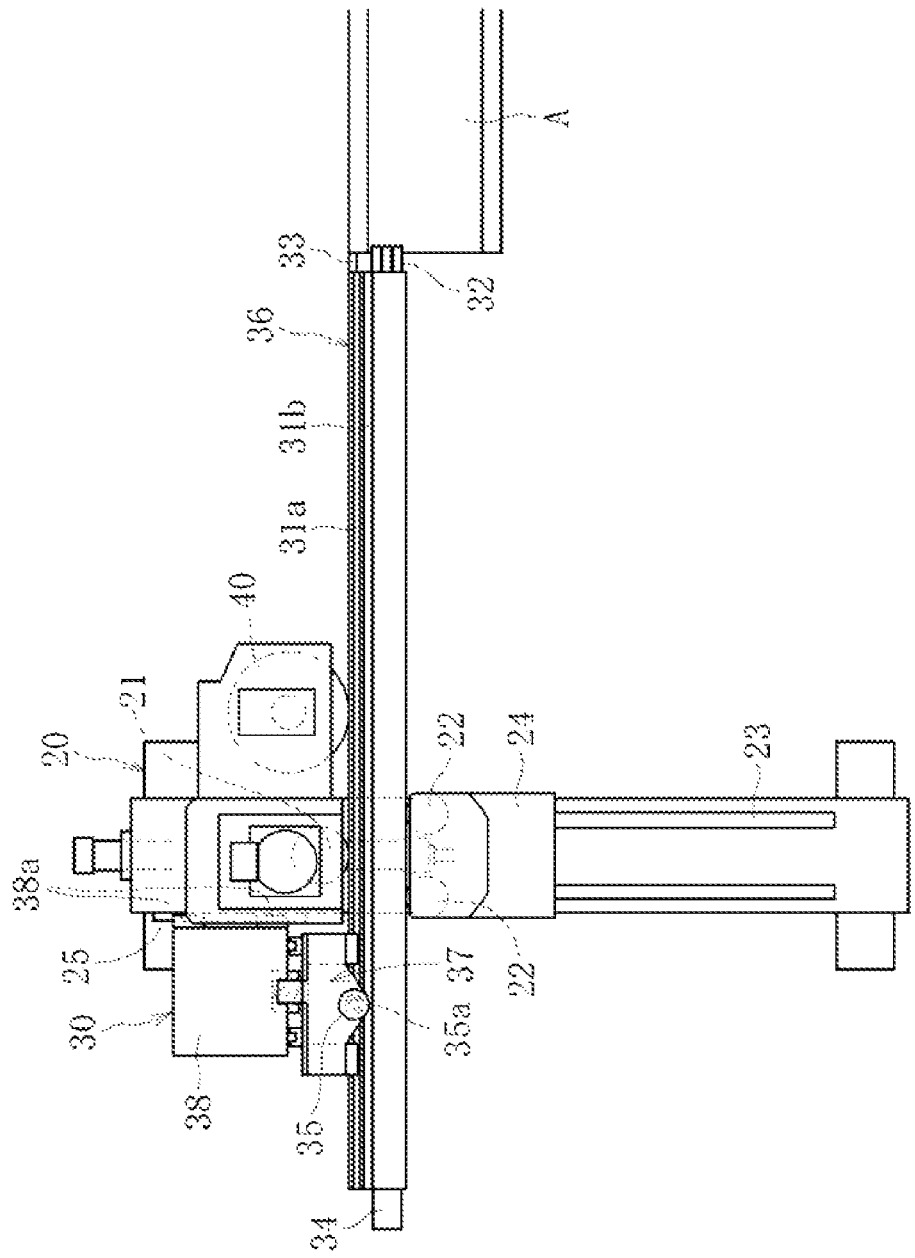
FIG. 4 is a plane view of the pinch roller apparatus and the feed bar device.

Even while conveyance of the structural steel A by the pinch roller apparatus 20 is switched to conveyance by the feed bar device 30 as described above, the feeding amount of the structural steel A is measured by the length measuring disk 40. In other words, after the rear end portion of the structural steel A passes the length measuring disk 40, the length measuring disk 40 is caused to rotate through being held in contact with the feed bar 36, to thereby indirectly measure the feeding amount of the structural steel A. In this embodiment, as illustrated in FIG. 4, under a state in which the feed bar device 30 clamps the structural steel A, one side surface (side surface on the upper side of FIG. 4) of the structural steel A, a side surface of the positioning portion 33, and one side surface (side surface on the upper side of FIG. 4) of the feed bar 36 are aligned and arranged in the conveying direction on the same plane, and those side surfaces are continuous with each other without steps. Thus, the length measuring disk 40 is allowed to smoothly rotate even on a boundary portion between the structural steel A and the feed bar 36, and hence it is possible to precisely position the structural steel A over the entire length of the structural steel A without generating an error in length measuring.

Figure 11:
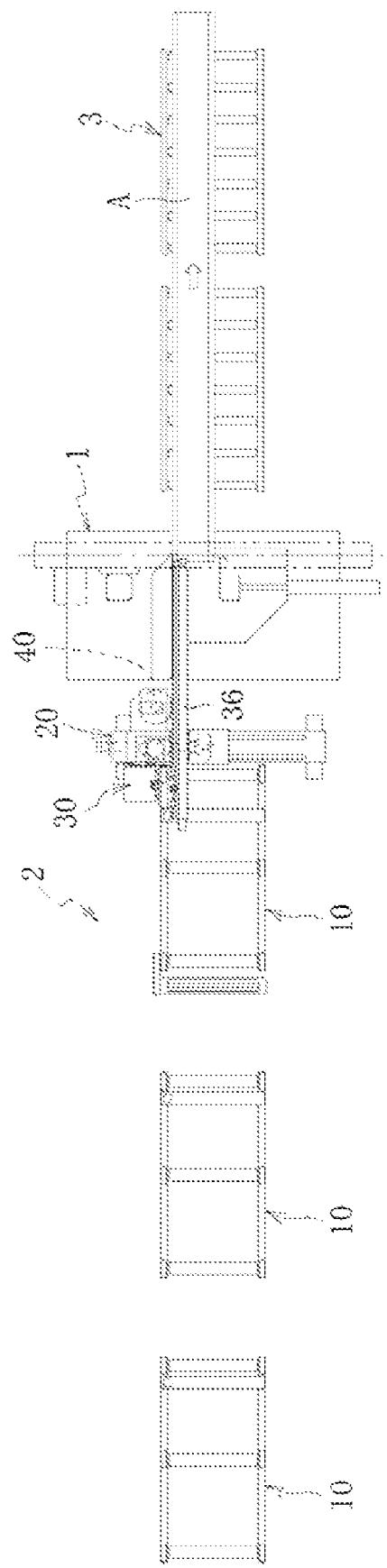
FIG. 11 is a plane view illustrating a state in which the positioning apparatus conveys the long material.

Thereafter, the feed bar 36 and the structural steel A are conveyed further forward, and the feed bar 36 is inserted until the front end portion (clamp portion 32) of the feed bar 36 reaches a desired position in an inside of the cutter 1 (see FIG. 11). In this way, the feed bar 36 can be inserted into and positioned in the inside of the working machine, and hence working can be performed on up to the rear end portion of the structural steel A. Therefore, it is possible to eliminate an unworkable portion of a material.

Note that, the present invention is not limited to the above-mentioned embodiment. For example, in the above-mentioned embodiment, a case where the positioning apparatus according to the present invention is applied to the working apparatus including the cutter is described. However, the positioning apparatus according to the present invention may be applied to a working apparatus including another working machine (for example, a fusing machine, a forging press, or a drilling machine).

REFERENCE SIGNS LIST 1 cutter (working machine)
2 positioning apparatus
3 carry-out roller table
10 conveying table
20 pinch roller apparatus
21 drive roller
22 idle roller
30 feed bar device
31a guide rail
32 clamp portion (holding portion)
36 feed bar
37 support portion
37a guide portion
38 base
40 length measuring disk (length measuring device)
A structural steel (long material)

The invention claimed is:

1. A long-material conveying and positioning apparatus, which conveys a long material to a working machine along a longitudinal direction of the long material, comprising:
   a pinch roller apparatus which comprises pinch rollers formed of a plurality of rollers including at least one drive roller, and conveys the long material toward the working machine by driving the drive roller to rotate under a state in which the pinch rollers sandwich the long material; and
   a feed bar device comprising
      a feed bar extending in a conveying direction of the long material,
      a support portion for supporting the feed bar to allow the feed bar to slide in the conveying direction, and
      a holding portion provided at an end portion of the feed bar on a side of the working machine, for holding the long material, the feed bar device allowing the feed bar to slide until the holding portion passes the pinch roller apparatus to reach a desired position in an inside of the working machine.

2. A long-material conveying and positioning apparatus according to claim 1, wherein:
   the feed bar comprises a guide rail extending in the conveying direction; and
   the support portion comprises a guide portion which fits onto the guide rail.

3. A long-material conveying and positioning apparatus according to claim 1, further comprising a length measuring device which is caused to rotate through being held in contact with the long material, to thereby measure a feeding amount of the long material,
   wherein the length measuring device is brought into contact with the feed bar holding the long material.

4. A long-material conveying and positioning apparatus according to claim 3, wherein:
   one side surface of the long material and one side surface of the feed bar are aligned and arranged in the conveying direction on the same plane under a state in which the long material is held by the feed bar device; and
   the length measuring device is brought into contact with the one side surface of the long material and the one side surface of the feed bar.

5. A long-material conveying and positioning apparatus according to claim 1, wherein the pinch rollers are allowed to drive the feed bar while sandwiching the feed bar.

6. A long-material conveying and positioning apparatus according to claim 1, further comprising a rack and pinion mechanism to slide the feed bar.

7. A long-material conveying and positioning apparatus according to claim 2, further comprising a rack and pinion mechanism to slide the feed bar.

8. A long-material conveying and positioning apparatus according to claim 3, further comprising a rack and pinion mechanism to slide the feed bar.

9. A long-material conveying and positioning apparatus according to claim 4, further comprising a rack and pinion mechanism to slide the feed bar.

10. A long-material conveying and positioning apparatus according to claim 5, further comprising a rack and pinion mechanism to slide the feed bar.

* * * * *